United States Patent
Kumamoto

(10) Patent No.: US 7,517,288 B2
(45) Date of Patent: Apr. 14, 2009

(54) GOLF CLUB SHAFT

(75) Inventor: Tomio Kumamoto, Hyogo (JP)

(73) Assignee: SRI Sports Limited, Kobe-shi (JP)

( * ) Notice: Subject to any disclaimer, the term of this patent is extended or adjusted under 35 U.S.C. 154(b) by 239 days.

(21) Appl. No.: 11/449,731

(22) Filed: Jun. 9, 2006

(65) Prior Publication Data
US 2007/0032310 A1 Feb. 8, 2007

(30) Foreign Application Priority Data
Aug. 2, 2005 (JP) ............................. 2005-223847

(51) Int. Cl.
*A63B 53/10* (2006.01)
(52) U.S. Cl. ...................................... 473/319
(58) Field of Classification Search .................. 473/319
See application file for complete search history.

(56) References Cited

U.S. PATENT DOCUMENTS

| | | | | |
|---|---|---|---|---|
| 5,538,769 A | * | 7/1996 | Sandman, Jr. ............... | 428/36.3 |
| 6,106,413 A | * | 8/2000 | Kusumoto ................... | 473/319 |
| 6,409,960 B1 | * | 6/2002 | Preece et al. ................ | 264/516 |
| 6,540,623 B2 | * | 4/2003 | Jackson ...................... | 473/319 |
| 6,723,279 B1 | * | 4/2004 | Withers et al. ............... | 419/27 |
| 6,773,358 B1 | * | 8/2004 | Sumitomo et al. ........... | 473/319 |
| 7,128,664 B2 | * | 10/2006 | Onoda et al. ................ | 473/347 |

FOREIGN PATENT DOCUMENTS

| | | | |
|---|---|---|---|
| JP | 2004-188191 A | | 7/2004 |
| JP | 2004-298357 A | | 10/2004 |
| JP | 2005-105152 | * | 4/2005 |

* cited by examiner

*Primary Examiner*—Stephen L. Blau
(74) *Attorney, Agent, or Firm*—Birch, Stewart, Kolasch & Birch, LLP

(57) ABSTRACT

A golf club shaft composed of a laminate of prepregs each containing a matrix resin and reinforcing fibers impregnated with the matrix resin. The matrix resin of at least one of the prepregs contains a fullerene or/and a fullerene compound. The content of the fullerene or/and the fullerene compound contained in the prepreg is set to not less than 0.002 wt % nor more than 1 wt % of an entire weight of the prepreg. The length of the prepreg containing the fullerene or/and the fullerene compound is set to not less than 2% nor more than 90% of the full length of the golf club shaft.

9 Claims, 7 Drawing Sheets

GOLF CLUB SHAFT

This nonprovisional application claims priority under 35 U.S.C. § 119(a) on Patent Application No(s). 2005-223847 filed in Japan on Aug. 2, 2005, the entire contents of which are hereby incorporated by reference.

FIELD OF THE INVENTION

The present invention relates to a golf club shaft made of a fiber reinforced resin. More particularly, the present invention is intended to improve the strength of a golf club shaft by improving a matrix resin composing the golf club shaft.

DESCRIPTION OF THE RELATED ART

In recent years, to allow golfers to hit golf balls at high speeds and stably in flight distances, the present tendency is to make a weight concentrate in a golf club head and make the golf club shaft as lightweight as possible. Therefore as the material of the golf club shaft, the fiber reinforced resin such as a carbon prepreg that is lightweight and has a high specific strength and specific rigidity is mainly used.

Owing to a low birth rate, there is a tendency for senior golfers to increase in the future. Thus there is a growing demand for the development of a golf club suitable for senior golfers. Because seniors are powerless, the golf club for them is demanded to be lightweight and have a high head speed so that flight distances of golf balls are constant. To increase the head speed, it is necessary to make the shaft soft and flexible. To this end, methods of decreasing the number of fiber layers of the shaft made of the fiber reinforced resin, decreasing the modulus of elasticity of fibers, and differentiating fiber angles from each other are conventionally used. But shafts manufactured by using these methods have a low strength. Thus it is difficult to manufacture a shaft having a light weight, a high flexibility, and a high strength.

To overcome the above-described problem, there are proposed golf club shafts as disclosed in Japanese Patent Application Laid-Open Nos. 2004-298357 (patent document 1) and 2004-188191 (patent document 2). In these patent documents, at least one part of the fiber reinforced resin layers composing the shaft contains the carbon nano-tube. According to the description made in the specification of the patent documents, the shaft is allowed to have a restrained bending rigidity, a light weight, and a high strength.

The carbon nano-tube is a faultless single layer tubular material formed by cylindrically rounding a flat hexagonal net of graphite or a multi-layer tubular material composed of hexagonal nets of graphite layered one upon another in a telescopic system. The carbon nano-tube is a superfine carbon fiber having a diameter in the range of 1 nm to 100 nm and has mechanical properties superior to conventional carbon fiber in its torsional strength and bending strength.

Because the carbon nano-tubes are cylindrical, they have a low fluidity and are liable to aggregate with one another. To make the sizes (longitudinal length) of the carbon nano-tubes equal to each other, it is necessary to precisely control arc discharge to be performed between carbon electrodes in manufacturing the carbon nano-tubes. It is difficult to manufacture the carbon nano-tubes having a uniform size. Therefore variations are liable to occur in the strength distribution of the fiber reinforced resin containing the carbon nano-tubes.

Patent document 1: Japanese Patent Application Laid-Open No. 2004-298357

Patent document 2: Japanese Patent Application Laid-Open No. 2004-188191

SUMMARY OF THE INVENTION

The present invention has been made in view of the above-described problems. Therefore it is an object of the present invention to provide a golf club shaft that is lightweight and has a proper degree of flexibility and strength.

To achieve the object, the present invention provides a golf club shaft composed of a laminate of prepregs each containing a matrix resin and reinforcing fibers impregnated with the matrix resin. The matrix resin of at least one of the prepregs contains a fullerene or/and a fullerene compound.

The fullerene is a carbon allotrope having a three-dimensional hollow spherical structure closed with covalent bonds of sp2 carbon atoms. As the molecular structure of the fullerene, carbon atoms construct five-membered rings and six-membered rings, thus constructing a polyhedron. Representative fullerene is soccer ball-shaped C60 composed of 60 carbon atoms constructing 12 five-membered rings and 20 six-membered rings. The C60 is inexpensive, can be mass-produced, and is physically stable. In addition to C60, it is possible to use C70, C74, C76, C78, C80, C84, C82, and C90. These fullerenes can be used singly or in combination.

As the fullerene compound, it is possible to use halogen-introduced $C60F_n$ (n=30 through 52), $C60C_{124}$, $C60Br_n$ (n=6, 8, 24), hydroxyl group-introduced $C60(OH)_{24}$, hydrogen-added $C60H_{24}$, a fullerene compound composed of the fullerene and metal such as Na, K, Rb or Cs doped in the crystal of the fullerene.

By mixing the fullerene or/and the fullerene compound with the matrix resin of the prepreg composing the shaft, it is possible to restrain an increase of the weight of the shaft and the rigidity thereof and yet enhance the bending modulus of elasticity and strength thereof.

This is because the hollow spherical fullerene and fullerene compound absorb a breaking energy, and in addition the fullerene and the resin combine with each other to form a firm crosslinking structure. Further the spherical fullerene is higher than the above-described cylindrical carbon nano-tube in its fluidity and dispersibility. Thus the fiber reinforced resin containing the hollow spherical fullerene has little variations in its strength.

As the fullerene to be used in the present invention, C60, C70, and C80 soluble in an organic solvent can be preferably used. To uniformly disperse the fullerene in the matrix resin, it is preferable to dissolve and disperse the fullerene and a monomer of the matrix resin in the organic solvent and evaporate the organic solvent by an evaporator.

After the fullerene is added to the matrix resin, it is preferable to knead them with a kneader, a three-roll or a biaxial extruder to disperse the fullerene in the matrix resin by utilizing a shear force.

To enhance the dispersibility of the fullerene, it is preferable to chemically treat the surface thereof with a surface-active agent such as polyoxyethylene lauryl ether.

It is possible to use the fullerene compound formed by bonding the fullerene such as C60, C70, and C80 with a functional group such as a hydroxyl group or metal atoms. In this case, it is possible to chemically bond the resin of the fiber reinforced resin or the surface of the reinforcing fiber with the functional group of the fullerene. Such a fullerene compound has improved affinity for the resin of the fiber reinforced resin and is hence capable of mixing with the resin to a high extent.

As the size of the fullerene or/and the fullerene compound to be added to the matrix resin, it is favorable that the average diameter of molecules thereof are not less than 0.6 nm nor more than 3.5 nm. The fullerene having an average diameter of less than 0.6 nm is theoretically present but it is very difficult to collect or produce it. Further the fullerene having an average diameter of less than 0.6 nm has a small area of contact between it and the matrix resin of the fiber reinforced resin. Consequently a weak bonding occurs between the fullerene and the matrix resin. Thereby the shaft has a low strength increase rate. When the average diameter of molecules of the fullerene or/and the fullerene compound are more than 3.5 nm, the molecules of the fullerene are very large. Thereby the fullerene has a low degree of dispersibility in the matrix resin of the fiber reinforced resin. Consequently a weak bonding occurs between the matrix resin and the fullerene and the fullerene compound. Thereby the shaft has a weak strength. The lower limit of the average diameter of the molecules of the fullerene or/and the fullerene compound is set to more favorably 0.7 nm and most favorably 0.75 nm. The upper limit of the average diameter of the molecules thereof is favorably 3.2 nm and most favorably 2.8 nm.

It is favorable that the length of the prepreg containing the fullerene or/and the fullerene compound (hereinafter often referred to as fullerene-containing prepreg) is set to not less than 2% nor more than 90% of the full length of the shaft. If the length of the fullerene-containing prepreg is less than 2%, the shaft has a small fullerene-containing region. Thus the length of the fullerene-containing prepreg is insufficient for improving the strength of the shaft. The length of the fullerene-containing prepreg is set to more favorably not less than 4% and most favorably not less than 6%. To improve the strength of the shaft, it is effective to widen the region in which the fullerene-containing prepreg is disposed. In this case, the shaft is expensive because the fullerene is very expensive. Therefore the length of the fullerene-containing prepreg is not more than 90% and more favorably not more than 80%. The fullerene-containing prepreg may be disposed over the full length of the shaft.

The full length of the golf club shaft is favorably not less than 800 mm nor more than 1270 mm. If the full length of the golf club shaft is less than 800 mm, the shaft is short and has a short flexing width. Thereby the shaft is incapable of displaying the effect to be brought about by the fullerene-containing prepreg. On the other hand, if the full length of the golf club shaft is more than 1270 mm, the shaft is difficult to swing and hence unsuitable for powerless seniors. In addition, it is necessary to use a large amount of the fullerene for the long shaft to allow the shaft to display the effect to be brought about by the fullerene-containing prepreg. Thereby the cost of manufacturing the shaft is high. The lower limit of the full length of the golf club shaft is set to more favorably 820 mm and most favorably 840 mm. The upper limit of the full length thereof is set to more favorably 1245 mm and most favorably 1219 mm.

When the fullerene-containing prepreg is disposed in a part of the shaft, it may be disposed in a region at the side of the head thereof, a region at the side of the grip thereof, and a central region thereof.

A concentrated stress is applied to the region at the side of the head of the shaft at a ball-hitting time. Therefore it is possible to effectively enhance the strength of the shaft when the fullerene-containing prepreg is disposed in the region at the side of the head of the shaft. In addition, because the fullerene-containing prepreg is excellent in its bending modulus of elasticity and bending strength, the fullerene-containing prepreg disposed in the region is capable of relieving a very high load applied to the region at the ball-hitting time, thereby preventing breakage of the shaft.

When the fullerene-containing prepreg is disposed at the central region of the shaft, a bending load is applied to the central region of the shaft owing to flexing of the shaft at the ball-hitting time. Therefore it is preferable to dispose the fullerene-containing prepreg excellent in its bending modulus of elasticity and bending strength in the central region of the shaft. When the fullerene-containing prepreg is disposed in the central region of the shaft, it is preferable to extend a part of the fullerene-containing prepreg disposed at the head side.

When the fullerene-containing prepreg is disposed in the region at the side of the grip of the shaft, a stress is relieved by the fullerene-containing prepreg. Thus the fullerene-containing prepreg relieves a shock at the ball-hitting time, thus giving a mild feeling to golfer's hands.

It is preferable to dispose the fullerene-containing prepreg in the region at the side of the head of the shaft and the region at the side of the grip thereof.

It is preferable to dispose the fullerene-containing prepreg in an intermediate layer between an inner layer and an outer layer. It is particularly preferable to interpose the fullerene-containing prepreg between a bias layer whose fiber angle forms ±45° to the axis of the shaft and a straight layer whose fiber angle forms 0° to the axis thereof.

In a swing behavior, a force acting in a twist direction and a force acting in a bending direction are simultaneously applied to the shaft. By disposing the fullerene-containing prepreg between the bias layer and the straight layer having effects for the forces acting in the twist direction and the bending direction, the fullerene-containing prepreg relieves a shearing generated to a stress-generated direction when the layer between the bias layer and the straight layer twists, thereby preventing an interlaminar separation.

It is favorable that the content of the fullerene or/and the fullerene compound contained in each layer consisting of the fullerene-containing prepreg is set to not less than 0.002 wt % nor more than 1 wt % of the entire weight of the prepreg.

When the content of the fullerene or/and the fullerene compound (hereinafter referred to as fullerene content) is less than 0.002 wt %, the fullerene content is so small that the fullerene-containing prepreg is incapable of sufficiently displaying the effect of improving the strength of the shaft. On the other hand, when the fullerene content is more than 1 wt %, an aggregation action occurs and hence the fullerene or/and the fullerene compound have a low dispersibility in the matrix resin. Consequently the prepreg has a variation in the strength thereof and hence a low strength.

The lower limit of the fullerene content is set to favorably 0.005 wt %, more favorably 0.008 wt %, and most favorably 0.01 wt % of the entire weight of the prepreg. The upper limit of the fullerene content is set to favorably 0.8 wt % and more favorably 0.7 wt % of the entire weight of the prepreg.

As described above, according to the present invention, the prepreg composed of the matrix resin containing the fullerene or/and the fullerene compound having a high dispersibility is used for the shaft. Thereby it is possible to restrain an increase of the weight of the shaft and the bending rigidity thereof and yet effectively enhance the strength thereof without variations. Therefore the shaft of the present invention is lightweight and has a high flexibility and strength and is hence suitable for powerless players such as senior golfers.

DETAILED DESCRIPTION OF THE PREFERRED EMBODIMENTS

The embodiments of the present invention will be described below with reference to the drawings.

Figure 1:
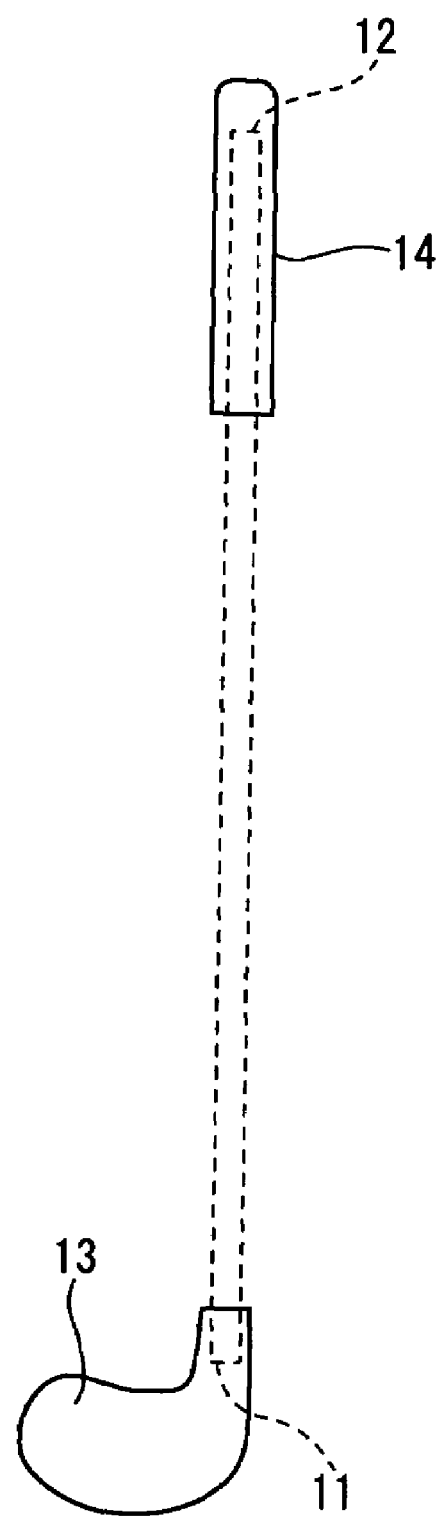
FIG. 1 is a schematic view showing a golf club according to a first embodiment of the present invention.
Figure 2:
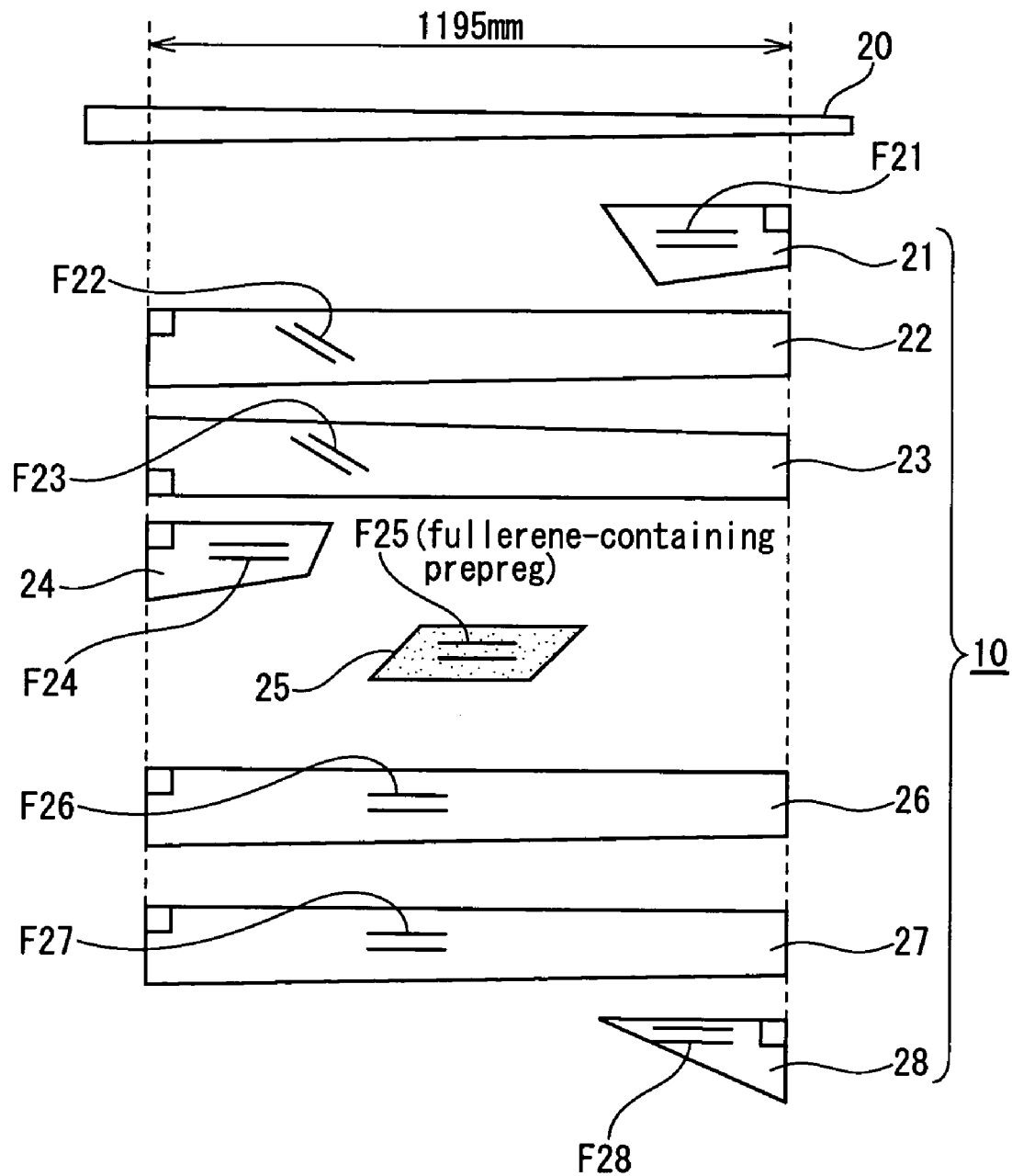
FIG. 2 shows a layered construction of prepregs of the golf club shaft shown in FIG. 1.
Figure 3:
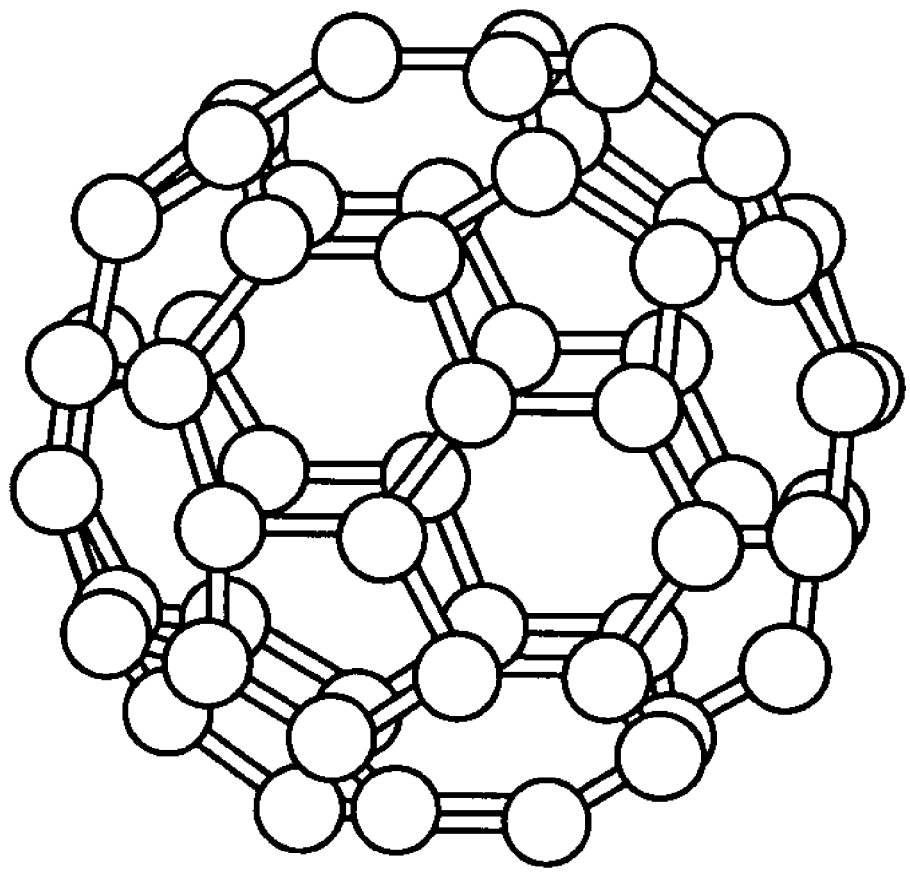
FIG. 3 shows the molecular structure of a fullerene contained in the golf club shaft shown in FIG. 1.

FIGS. 1 through 3 show a golf club shaft 10 according to a first embodiment of the present invention. The shaft 10 is composed of a laminate of prepreg sheets in which reinforcing fibers arranged in a direction are impregnated with a matrix resin. The golf club shaft 10 of the first embodiment is composed of a tapered long tubular body composed of a laminate of prepregs 21 through 28.

A head 13 is mounted on a head-side tip 11 of the shaft 10 having a smaller diameter. A grip 14 is mounted on a grip-side butt 12 thereof having a larger diameter.

The full length of the shaft 10 is set to 800 mm to 1270 mm. The full length of the shaft 10 of the first embodiment is set to 1195 mm. The weight of the shaft 10 is set to 35 g to 70 g. The weight of the shaft 10 of the first embodiment is set to 52 g.

As shown in FIG. 2, the shaft 10 is manufactured as follow: Eight prepregs 21 through 28 are sequentially wound and layered round a mandrel 20 by using a sheet winding method. Thereafter to perform integral molding, a tape (not shown) made of polypropylene is wound round the laminate of the prepregs 21 through 28. After the laminate around which the tape has been wound is heated in an oven under pressure to harden the resin, the mandrel 20 is drawn out of the laminate. After the surface of the shaft 10 is polished, both ends thereof are cut. Then the shaft 10 is painted.

Carbon fibers (F21 through F28) are used as the reinforcing fiber of the prepregs 21 through 28. Epoxy resin is used as the matrix resin of the prepregs 21 through 28. Thermosetting resin other than the epoxy resin may be used as the matrix resin.

Of the prepreg 21 which is the innermost first layer through the prepreg 28 which is the outermost eighth layer, the fifth-layer prepreg 25 is formed as a fullerene-containing prepreg A in which the fullerene is contained in the epoxy resin. The fullerene is not contained in the epoxy resin of the other prepregs.

The fullerene-containing fifth-layer prepreg 25 is formed as follows: The fullerene (C60) having a soccer ball-shaped hollow spherical molecular structure as shown in FIG. 3 is added to the epoxy resin. Thereafter the mixture of the epoxy resin and the fullerene is kneaded. The carbon fiber F25 is immersed in the epoxy resin containing the fullerene therein.

The content of the fullerene or/and the fullerene compound contained in the prepreg is 0.01 wt % of the entire weight of the fullerene-containing fifth-layer prepreg 25.

The fullerene is dissolved in an organic solvent before the fullerene is mixed with the epoxy resin. After molecules of the fullerene are uniformly dispersed in the organic solvent, the mixture is added to the monomer of the epoxy resin.

The layered state of the prepregs 21 through 28 shown in FIG. 2 is described below.

The innermost first-layer prepreg 21 is disposed at the head-side tip portion of the shaft 10 and has a width equal to four turns thereof around the mandrel 20. The first-layer prepreg 21 has a length of 220 mm and a thickness of 0.104 mm. The reinforcing fiber F21 forms an angle of 0° to the axis of the shaft 10.

The second-layer prepreg 22 is disposed over the full length of the shaft 10. The second-layer prepreg 22 has a width equal to two turns thereof around the mandrel 20. The second-layer prepreg 22 has a thickness of 0.0570 mm. The reinforcing fiber F22 has an angle of 45° to the axis of the shaft 10.

The third-layer prepreg 23 is disposed over the full length of the shaft 10. The prepreg third-layer 23 has a width equal to two turns thereof around the mandrel 20. The third-layer prepreg 23 has a thickness of 0.0570 mm. The reinforcing fiber F23 forms an angle of 45° to the axis of the shaft 10.

The fourth-layer prepreg 24 is disposed at the grip-side butt portion of the shaft 10 and has a width equal to one turn thereof around the mandrel 20. The fourth-layer prepreg 24 has a length of 420 mm and a thickness of 0.0840 mm. The reinforcing fiber F24 forms an angle of 0° to the axis of the shaft 10.

The fifth-layer prepreg 25 consists of the fullerene-containing prepreg and is disposed in a region spaced at an interval of 70 mm to 670 mm from the head-side tip 11 of the shaft 10. The fifth-layer prepreg 25 has a width equal to one turn thereof around the mandrel 20. The fifth-layer prepreg 25 has a length of 600 mm and a thickness of 0.1050 mm. The reinforcing fiber F25 forms an angle of 0° to the axis of the shaft 10.

The sixth-layer prepreg 26 is disposed over the full length of the shaft 10. The sixth-layer prepreg 26 has a width equal to one turn thereof around the mandrel 20. The sixth-layer prepreg 26 has a thickness of 0.084 mm. The reinforcing fiber F26 forms an angle of about 0° to the axis of the shaft 10.

The seventh-layer prepreg 27 is disposed over the full length of the shaft 10. The seventh-layer prepreg 27 has a width equal to one turn thereof around the mandrel 20. The seventh-layer prepreg 27 has a thickness of 0.1050 mm. The reinforcing fiber F27 forms an angle of 0° to the axis of the shaft 10.

The outermost eighth-layer prepreg 28 is disposed at the head-side tip portion of the shaft 10 and has a width equal to three turns thereof around the mandrel 20. The eighth-layer prepreg 28 has a length of 280 mm and a thickness of 0.0840 mm. The reinforcing fiber F28 forms an angle of 0° to the axis of the shaft 10.

The shaft 10 having the above-described construction has the fullerene-containing prepreg 25 disposed at the central portion of the shaft 10 in its longitudinal direction. Therefore when a ball is hit with a golf club composed of the shaft 10, without the flexing of the shaft 10 being obstructed, the shaft 10 has a high strength in its central region to which a high bending load is applied. Further the average molecular diameter of the spherical fullerene of the fullerene-containing prepreg 25 is 0.6 nm. Thus the fullerene-containing prepreg 25 has a high fluidity and dispersibility. Furthermore because the fullerene is uniformly mixed with the epoxy resin, the fullerene-containing prepreg 25 has little variations in its strength.

The fullerene-containing prepreg 25 is disposed between the bias third-layer prepreg 23 and the straight sixth-layer prepreg 26. Thus the fullerene-containing prepreg 25 has an action of relieving a shearing stress generated between the adjacent layers, thereby enhancing the strength of the shaft 10.

The length of the fullerene-containing prepreg 25 is set to 50% of the full length of the shaft 10. The content of the fullerene for the total weight of the fullerene-containing prepreg 25 is set to 3 wt %.

The disposition range of the fullerene-containing prepreg 25 and the mixing amount of the fullerene are so set that the strength of the shaft is improved and that an increase of the weight of the shaft and the cost thereof are restrained. Thus the shaft is lightweight and the cost of manufacturing it is low. The fullerene-containing matrix resin hardly affects the bending rigidity of the shaft. Thus the shaft has a proper degree of flexibility.

Therefore although the shaft 10 is lightweight, it provides stability in the flight distance of a golf ball and has a high strength. Thus the shaft 10 is suitable for powerless seniors.

Figure 4:
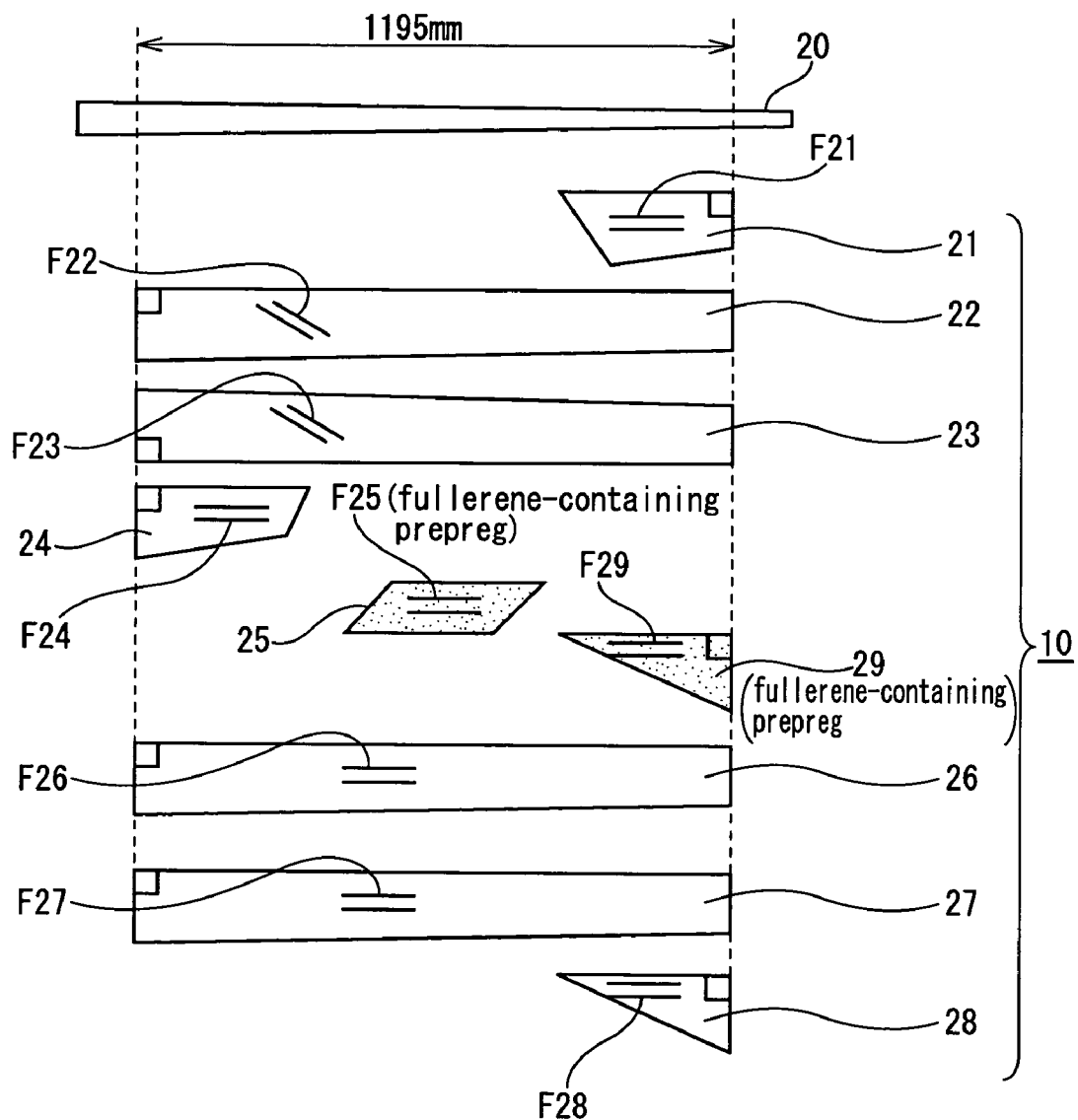
FIG. 4 is a schematic view showing a golf club according to a second embodiment of the present invention.

FIG. 4 shows the second embodiment. The second embodiment is different from the first embodiment in that a prepreg 29 containing the fullerene compound is disposed between the fifth-layer fullerene-containing prepreg 25 and the sixth-layer 26. A reinforcing fiber F29 of the fullerene-containing prepreg 29 forms 0° to the axis of the shaft. The fullerene-containing prepreg 29 is disposed at the head-mounted side of the shaft. The fullerene-containing prepreg 29 has a length of 100 mm and a thickness of 0.1050 mm.

As the fullerene compound to be contained in the matrix resin, halogen-introduced C60F48 is used. The content of the fullerene compound for the entire weight of the prepreg 29 is set to 3 wt %.

By disposing the fullerene-containing prepreg 25 at the central portion of the shaft in its longitudinal direction thereof and the fullerene-containing prepreg 29 at the head-mounted side thereof, it is possible to enhance the strength of the head-mounted side of the shaft on which a load acts collectively when the ball is hit.

Figure 5:
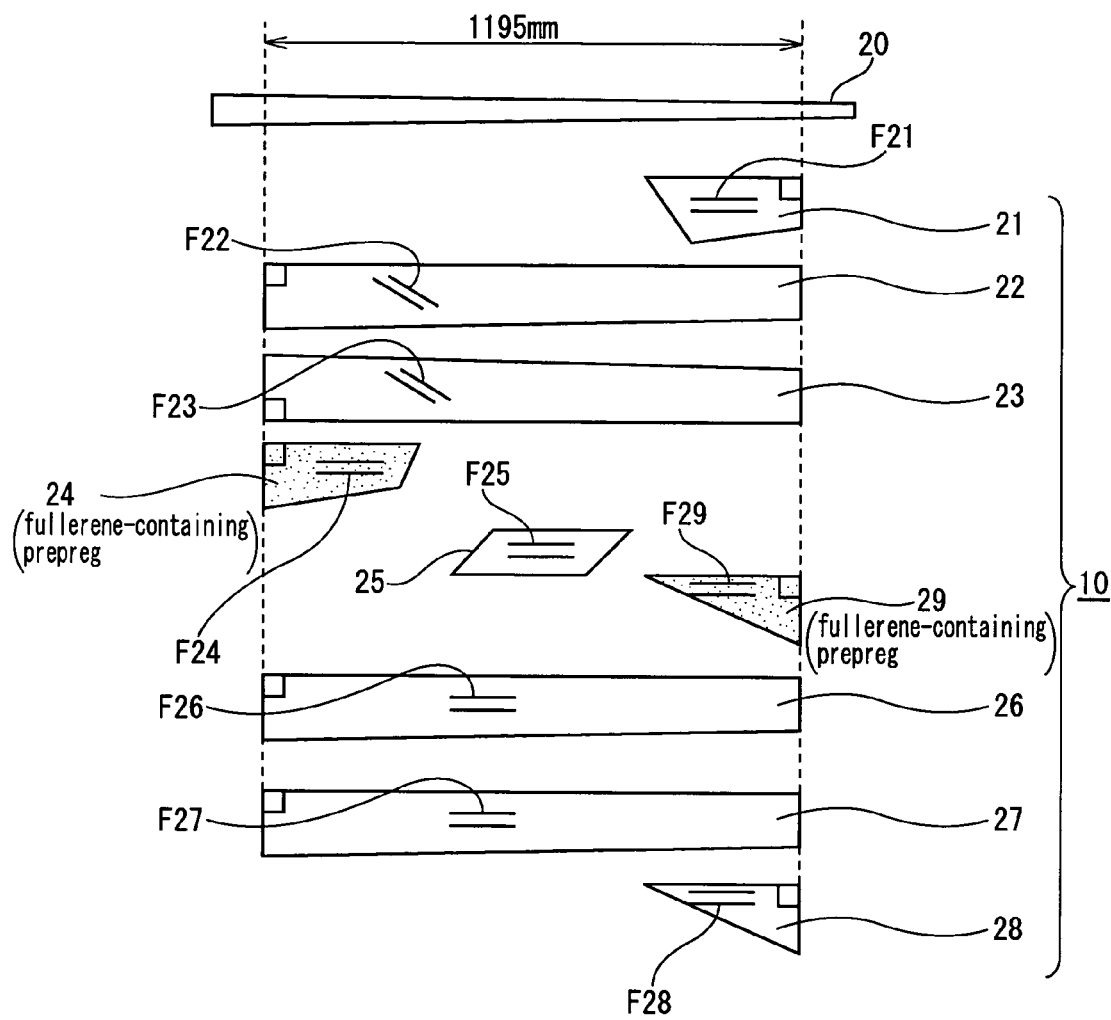
FIG. 5 is a schematic view showing a golf club according to a third embodiment of the present invention.

FIG. 5 shows the third embodiment. The fourth-layer prepreg 24 disposed at the grip side is formed as the fullerene-containing prepreg. In addition, the fullerene compound-containing prepreg 29 is disposed between the fifth-layer prepreg 25 and the sixth-layer 26 at the head-mounted side of the shaft, similarly to the second embodiment. The fullerene-containing fourth-layer prepreg 24 has a length of 400 mm and a thickness of 0.1050 mm. The fullerene-containing prepreg 29 has a length of 100 mm and a thickness of 0.1050 mm. The content of the fullerene for the entire weight of the fourth-layer prepreg 24 and that of the fullerene for the entire weight of the fullerene-containing prepreg 29 are set to both 0.02 wt %.

The fullerene-containing prepreg disposed at the grip-mounted side is capable of relieving a shear stress generated between the adjacent layers of the grip-side portion.

Figure 6:
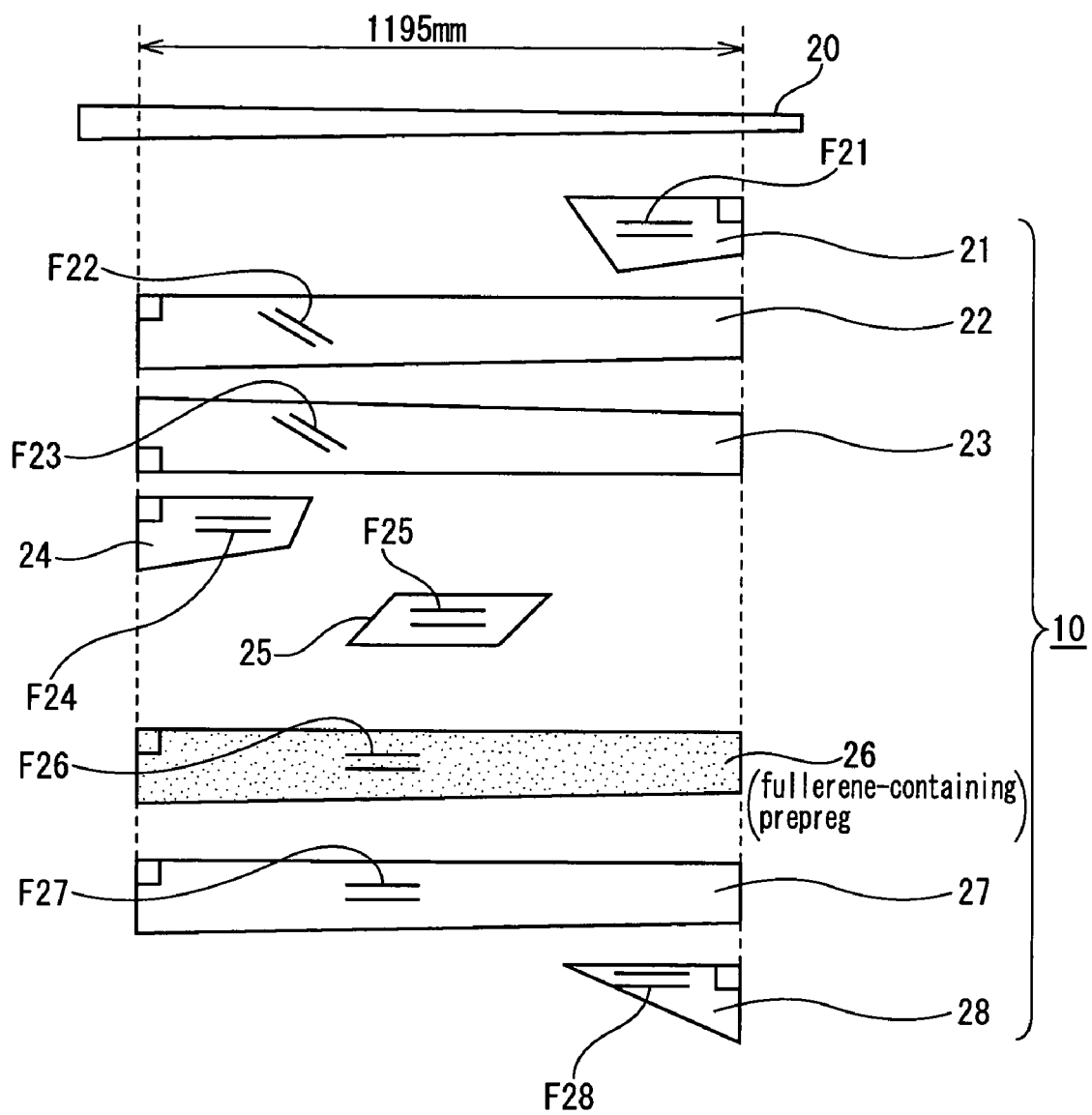
FIG. 6 is a schematic view showing a golf club according to a fourth embodiment of the present invention.

FIG. 6 shows the fourth embodiment. The fourth embodiment is different from the first embodiment in that only the sixth-layer prepreg 26 disposed over the full length of the shaft consists of the fullerene-containing prepreg.

The fullerene contained in the sixth-layer prepreg 26 is similar to that of the first embodiment. But the content of the fullerene for the entire weight of the sixth-layer prepreg 26 is set to 1 wt %.

The fullerene-containing prepreg disposed over the full length of the shaft enhances the strength of the shaft entirely. In this case, the content of the fullerene is set to a small amount of 1 wt % for the entire weight of the fullerene-containing prepreg. Therefore the fullerene-containing prepreg does not prevent the shaft from flexing and the cost of manufacturing it from becoming high.

EXAMPLES

Examples 1 through 8 of the golf club shaft of the present invention and a golf club shaft of a comparison example 1 were formed.

As shown in table 1, in the golf club shafts of the examples 1 through 8 of the present invention and the golf club shaft of the comparison example 1, the content of the fullerene of the fullerene-containing prepreg of the golf club shaft, the position of the fullerene-containing prepreg, and the length of the fullerene-containing prepreg were varied from one another. The three-point bending strength of each golf club shaft that is described later was measured. Table 1 shows the results.

TABLE 1

|  | Comparison example 1 | Example 7 | Example 8 | Example 1 | Example 2 |
| --- | --- | --- | --- | --- | --- |
| Fullerene content | 0 wt % | 0.002 wt % | 1.2 wt % | 0.01 wt % | 0.03 wt % |
| Position where fullerene-containing prepreg is used | — | 70 mm to 100 mm from tip | 85 mm to 95 mm from tip | 70 mm to 100 mm from tip | 70 mm to 670 mm from tip |
| Full length of shaft |  | 1195 mm | 1195 mm | 1195 mm | 1195 mm |
| Value of X |  | 0.025 | 0.008 | 0.025 | 0.5 |
| Three-point bending strength |  |  |  |  |  |
| Point T | 180 | 180 | 175 | 220 | 230 |
| Point A | 70 | 72 | 73 | 85 | 90 |
| Point B | 60 | 60 | 61 | 61 | 60 |
| Point C | 90 | 90 | 91 | 91 | 90 |

|  | Example 3 | Example 4 | Example 5 | Example 6 |
| --- | --- | --- | --- | --- |
| Fullerene content | 1.0 wt % | 0.8 wt % | 0.01 wt % | 0.01 wt % |
| Position where fullerene-containing prepreg is used | 70 mm to 320 mm from tip | 70 mm to 100 mm from tip | 895 mm to 1195 mm from tip | 70 mm to 100 mm from tip 895 mm to 1195 mm from tip |
| Full length of shaft | 1195 mm | 1195 mm | 1195 mm | 1195 mm |
| Value of X | 0.21 | 0.025 | 0.25 | 0.275 |
| Three-point bending strength |  |  |  |  |
| Point T | 240 | 238 | 180 | 216 |
| Point A | 95 | 96 | 70 | 85 |

TABLE 1-continued

| | | | | |
|---|---|---|---|---|
| Point B | 61 | 60 | 62 | 69 |
| Point C | 90 | 91 | 105 | 105 |

The golf club shafts of the examples 1 through 8 of the present invention and the comparison example 1 were formed by the sheet winding method similarly to the above-described embodiments. In the shafts of the examples 1 through 8, the eight prepregs (first layer to eighth layer) shown in table 2 were layered sequentially similarly to the first embodiment shown in FIG. 2. The shaft of the comparison example 1 did not have the fifth-layer composed of the fullerene-containing prepreg 25 shown in FIG. 2.

The shafts of the examples 1 through 8 and the shaft of the comparison example 1 had a length of 1195 mm.

The fifth layer of shafts of the examples 1 through 8 consisted of the fullerene-containing prepreg. The fullerene (C60) of the fullerene-containing prepreg was produced by Frontier Carbon Inc. The fullerene (C60) was mixed with the epoxy resin. As the reinforcing fiber of the fullerene-containing prepreg, carbon fibers whose modulus of elasticity was 30 t was used.

In the shafts of the examples 1 through 8 of the present invention and the shaft of the comparison example 1, prepregs shown in table 2 were used as the prepregs not containing the fullerene.

TABLE 2

| | Maker | Modulus of elasticity of fiber | Name of fiber | Name of prepreg | Fiber angle |
|---|---|---|---|---|---|
| 1$^{st}$ layer | Toray Industries Inc. | 24t | T700 | 3255G-10 | 0° |
| 2$^{nd}$ layer | Toray Industries Inc. | 30t | T800 | 2255F-10 | +45° |
| 3$^{rd}$ layer | Toray Industries Inc. | 30t | T800 | 2255F-10 | −45° |
| 4$^{th}$ layer | Toray Industries Inc. | 30t | T800 | 2255F-15 | 0° |
| 6$^{th}$ layer | Toray Industries Inc. | 30t | T800 | 2255F-12 | 0° |
| 7$^{th}$ layer | Toray Industries Inc. | 30t | T800 | 2255F-15 | 0° |
| 8$^{th}$ layer | Toray Industries Inc. | 24t | T700 | 3255G-10 | 0° |

Example 1

The content of the fullerene contained in the fifth-layer fullerene-containing prepreg was set to 0.01 wt %. The fifth-layer fullerene-containing prepreg was disposed in the range spaced at an interval of 70 mm to 100 mm from the head-side tip 11. A value of X was set to 0.025. The result of the measurement of the three-point bending strength which will be described later was 220 kgf at a point T, 85 kgf at a point A, 61 kgf at a point B, and 91 kgf at a point C.

Example 2

The shaft of the example 2 was similar to that of the first embodiment in the specification thereof. More specifically, the content of the fullerene contained in the fullerene-containing prepreg was set to 0.03 wt %. The fullerene-containing prepreg was disposed in the range spaced at an interval of 70 mm to 670 mm from the head-side tip 11. The Value of X was set to 0.5. The result of the measurement of the three-point bending strength was 230 kgf at the point T, 90 kgf at the point A, 60 kgf at the point B, and 90 kgf at the point C.

Example 3

The content of the fullerene contained in the fullerene-containing prepreg was set to 1.0 wt %. The fullerene-containing prepreg was disposed in the range spaced at an interval of 70 mm to 320 mm from the head-side tip 11. The Value of X was set to 0.21. The result of the measurement of the three-point bending strength was 240 kgf at the point T, 95 kgf at the point A, 61 kgf at the point B, and 90 kgf at the point C.

Example 4

The content of the fullerene contained in the fullerene-containing prepreg was set to 0.8 wt %. The fullerene-containing prepreg was disposed in the range spaced at an interval of 70 mm to 100 mm from the head-side tip 11. The Value of X was set to 0.25. The result of the measurement of the three-point bending strength was 238 kgf at the point T, 96 kgf at the point A, 60 kgf at the point B, and 91 kgf at the point C.

Example 5

The content of the fullerene contained in the fullerene-containing prepreg was set to 0.01 wt %. The fullerene-containing prepreg was disposed in the range spaced at an interval of 895 mm to 1195 mm from the head-side tip 11. The Value of X was set to 0.25. The result of the measurement of the three-point bending strength was 180 kgf at the point T, 70 kgf at the point A, 62 kgf at the point B, and 105 kgf at the point C.

Example 6

The fifth-layer prepreg and the eighth-layer prepreg were formed as the fullerene-containing prepreg and disposed at the central portion of the shaft and the grip side (butt side) thereof respectively. That is, the fifth-layer fullerene-containing prepreg was disposed in the range spaced at an interval of 70 mm to 100 mm from the head-side tip 11. The eighth-layer fullerene-containing prepreg was disposed in the range spaced at an interval of 895 mm to 1195 mm from the head-side tip 11. The Value of X was set to 0.275. The content of the fullerene contained in the fifth-layer fullerene-containing prepreg and that of the fullerene contained in the eighth-layer fullerene-containing prepreg were set to both 0.01 wt %. The result of the measurement of the three-point bending strength was 216 kgf at the point T, 85 kgf at the point A, 69 kgf at the point B, and 105 kgf at the point C.

Example 7

The content of the fullerene contained in the fifth-layer fullerene-containing prepreg was set to 0.008 wt %. The fifth-layer fullerene-containing prepreg was disposed in the range spaced at an interval of 70 mm to 100 mm from the head-side tip 11. The Value of X was set to 0.025. The result of the measurement of the three-point bending strength was 180 kgf at the point T, 72 kgf at the point A, 60 kgf at the point B, and 90 kgf at the point C.

Example 8

The content of the fullerene contained in the fifth-layer fullerene-containing prepreg was set to 1.2 wt %. The fifth-layer fullerene-containing prepreg was disposed in the range spaced at an interval of 85 mm to 95 mm from the head-side tip 11. The Value of X was set to 0.008. The result of the measurement of the three-point bending strength was 175 kgf at the point T, 73 kgf at the point A, 61 kgf at the point B, and 91 kgf at the point C.

Comparison Example 1

The shaft is not provided with the fullerene-containing prepreg. The prepregs 26, 27, and 28 were sequentially layered on the fourth-layer prepreg 24. The result of the measurement of the three-point bending strength was 180 kgf at the point T, 70 kgf at the point A, 60 kgf at the point B, and 90 kgf at the point C.

The measurement of the three-point bending strength

Figure 7:
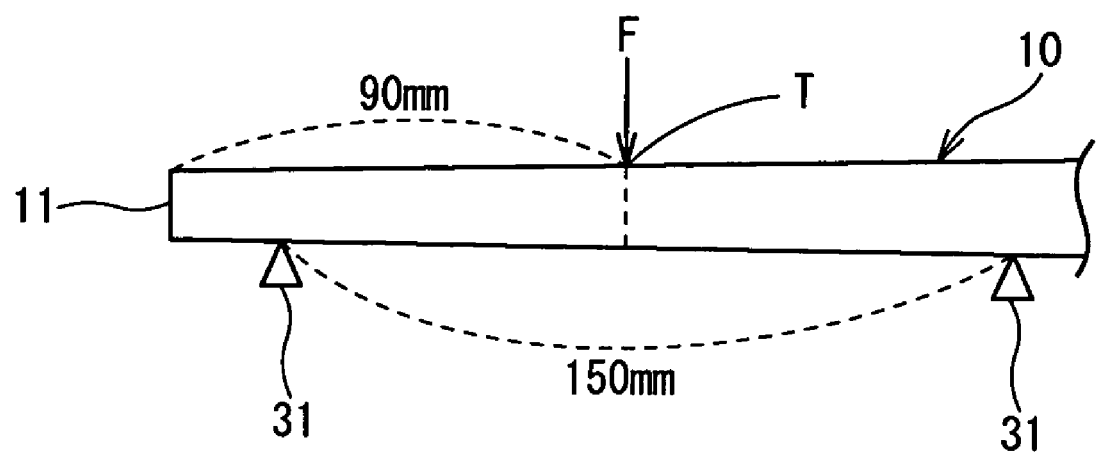
FIG. 7 shows the method of measuring a three-point bending strength.

The three-point bending strength means a breaking strength provided by the Product Safety Association. As shown in FIG. 7, a load F is applied from above to a shaft 10 supported at three points. The value (peak value) of the load when the shaft 10 was broken was measured. The bending strength was measured at points spaced at intervals of 90 mm (point T), 175 mm (point A), and 525 mm (point B) from the tip 11 of the shaft 10, respectively and a point C spaced at an interval of 175 mm from the butt 12 of the shaft 10. The span between supporting points 31 was 150 mm when the bending strength was measured at the point T and 300 mm when the bending strength was measured at the points A, B, and C (FIG. 7 shows the case in which the bending strength was measured at the point T).

As indicated in table 1, in the shafts of the examples 1 through 6, the content of the fullerene was set to not less than 0.002 wt % nor more than 1.0 wt %, and the Value of X was set to not less than 0.02 nor more than 0.8. These shafts had a high strength at least one of the tip, head side, central portion, and grip side thereof.

The fullerene-containing prepreg of the shaft of the example 7 contained less than 0.002 wt % of the fullerene. Therefore the shaft of the example 7 had a smaller effect of the fullerene than the shafts of the examples 1 through 6.

The shaft of the example 8 had the Value of X less than 0.02. Further the shaft had a smaller area than the shafts of the other examples in the region where the fullerene-containing prepregs were disposed. The content of the fullerene was more than 1.0 wt %. Therefore the shaft had a high strength but had a variation in its strength.

Because the shaft of the comparison example 1 was not provided with the fullerene-containing prepreg, it had a low bending strength at all portions thereof.

Comparing the shaft of the example 1 with the shaft of the example 4 both having the fullerene-containing prepreg disposed in the same region of the shaft, the shaft of the example 4 had a higher strength than the shaft of the example 1. This is because the content of the fullerene contained in the fullerene-containing prepreg of the shaft of the example 1 was 0.002 wt %, whereas the content of the fullerene contained in the fullerene-containing prepreg of the shaft of the example 4 was 0.8 wt %.

Comparing the shaft of the example 2 with the shaft of the example 3 both having the fullerene-containing prepreg disposed at the head side of the shaft 10, the shaft of the example 3 had a higher strength than the shaft of the example 2 at the points T and A. This is because the content of the fullerene contained in the fullerene-containing prepreg of the shaft of the example 2 was 0.03 wt % and the Value of X was 0.5, whereas the content of the fullerene contained in the fullerene-containing prepreg of the shaft of the example 3 was 1.0 wt % and the value of X was 0.21.

Comparing the shaft of the example 1 in which the fullerene-containing prepreg was disposed at the head side thereof, the shaft of the example 5 in which the fullerene-containing prepreg was disposed at the grip side thereof, and the shaft of the example 6 in which the fullerene-containing prepreg was disposed at the head side thereof and the grip side thereof, the shaft of the example 6 had the highest strength in the most favorable balance.

What is claimed is:

1. A golf club shaft composed of a laminate of prepregs each containing a matrix resin and reinforcing fibers impregnated with said matrix resin,
    wherein said matrix resin of at least one of said prepregs contains a fullerene or/and a fullerene compound, wherein in a longitudinal direction of said golf club shaft, a length of each of said prepregs containing said fullerene or/and said fullerene compound is set to not less than 2% nor more than 90% of a full length of said golf club shaft, and wherein said prepreg containing said fullerene or/and said fullerene compound is disposed in an intermediate layer sandwiched between an inner layer and an outer layer wherein said inner layer and said outer layer are composed of said laminate of prepregs and do not contain said fullerene or/and said fullerene compound.

2. The golf club shaft according to claim 1, wherein said fullerene or/and said fullerene compound includes C60, C70, C74, C76, C78, C80, and C84.

3. The golf club shaft according to claim 1, wherein said fullerene or/and said fullerene has an average molecule diameter of 0.6 to 3.5 nm.

4. A golf club shaft composed of a laminate of prepregs each containing a matrix resin and reinforcing fibers impregnated with said matrix resin,
    wherein said matrix resin of at least one of said prepregs contains a fullerene or/and a fullerene compound, wherein a content of said fullerene or/and said fullerene compound contained in each of said prepregs containing said fullerene or/and said fullerene compound is set to not less than 0.002 wt % nor more than 1 wt % of an entire weight of each of said prepregs, and wherein said prepreg containing said fullerene or/and said fullerene compound is disposed in an intermediate layer sandwiched between an inner layer and an outer layer wherein said inner layer and said outer layer are composed of said laminate of prepregs and do not contain said fullerene or/and said fullerene compound.

5. The golf club shaft according to claim 4, wherein said fullerene or/and said fullerene compound includes C60, C70, C74, C76, C78, C80, and C84.

6. The golf club shaft according to claim 4, wherein said fullerene or/and said fullerene has an average molecule diameter of 0.6 to 3.5 nm.

7. A golf club shaft composed of a laminate of prepregs each containing a matrix resin and reinforcing fibers impregnated with said matrix resin, wherein said matrix resin of at least one of said prepregs contains a fullerene or/and a fullerene compound, wherein in a longitudinal direction of said golf club shaft, a length of each of said prepregs containing said fullerene or/and said fullerene compound is set to not less than 2% nor more than 90% of a full length of said golf club shaft, wherein a content of said fullerene or/and said fullerene compound contained in each of said prepregs containing said fullerene or/and fullerene compound is set to not less than 0.002 wt % nor more than 1 wt % of an entire weight of each of said prepregs, and wherein said prepreg containing said fullerene or/and said fullerene compound is disposed in an intermediate layer sandwiched between an inner layer and an outer layer wherein said inner layer and said outer layer are composed of said laminate of prepregs and do not contain said fullerene or/and said fullerene compound.

8. The golf club shaft according to claim 7, wherein said fullerene or/and said fullerene compound includes C60, C70, C74, C76, C78, C80, and C84.

9. The golf club shaft according to claim 7, wherein said fullerene or/and said fullerene has an average molecule diameter of 0.6 to 3.5 nm.

* * * * *